E. GRÜBLER.
MOTOR TRACTOR.
APPLICATION FILED OCT. 3, 1921.

1,422,438.

Patented July 11, 1922.
4 SHEETS—SHEET 1.

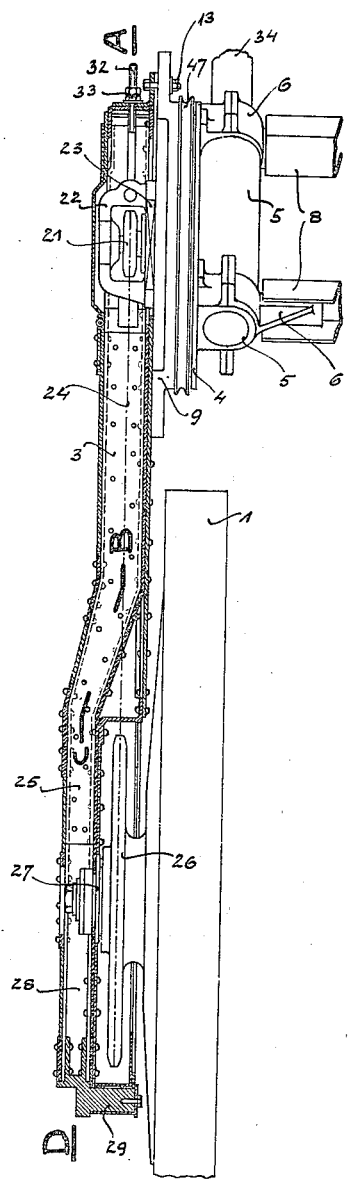
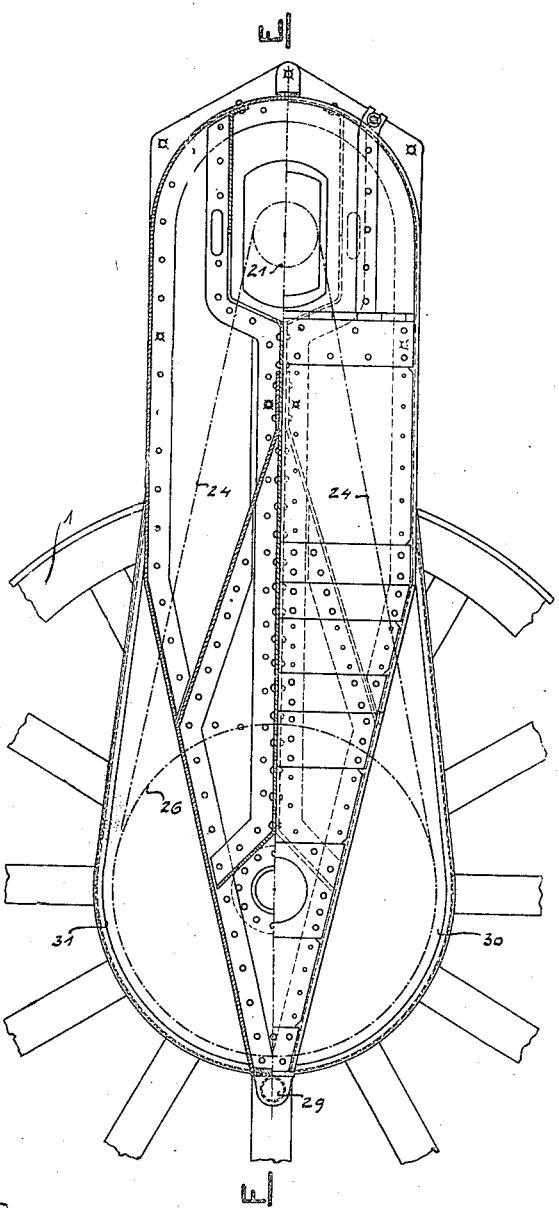

E. GRÜBLER.
MOTOR TRACTOR.
APPLICATION FILED OCT. 3, 1921.

1,422,438.

Patented July 11, 1922.
4 SHEETS—SHEET 3.

E. GRÜBLER.
MOTOR TRACTOR.
APPLICATION FILED OCT. 3, 1921.
1,422,438.
Patented July 11, 1922.
4 SHEETS—SHEET 4.
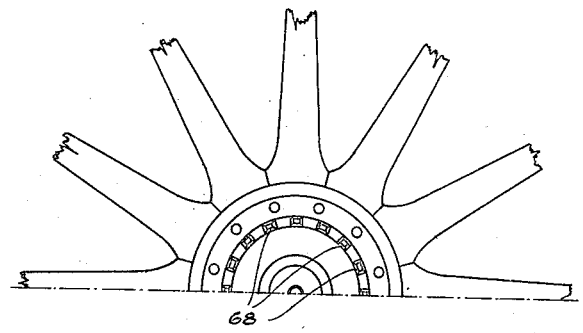
Fig. 13.
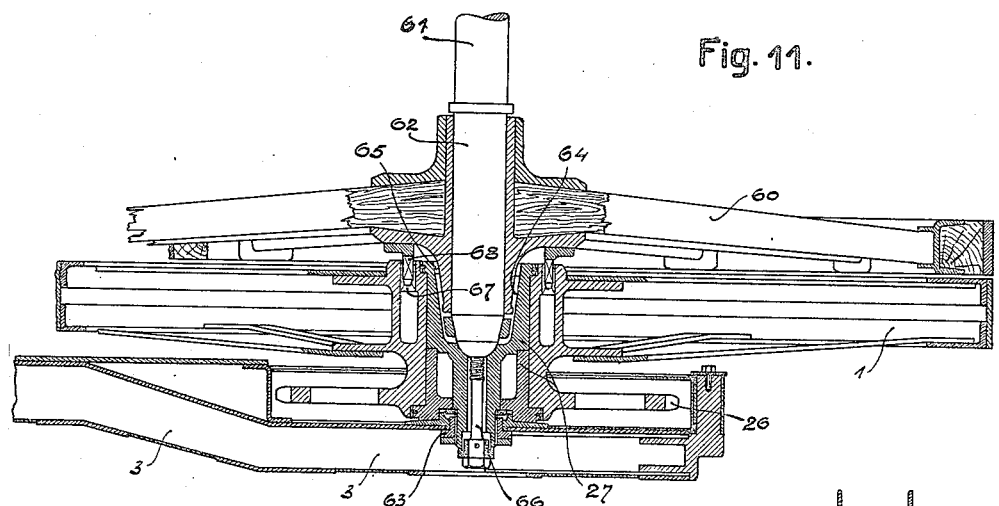
Fig. 11.
Fig. 12.
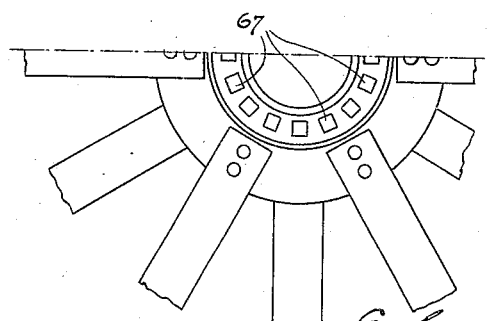
Fig. 14.
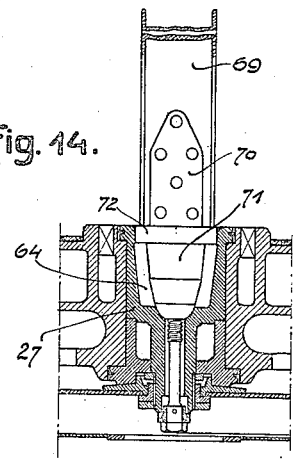
Erhard Grübler
Inventor
By Alexander Fowell
Attorneys

UNITED STATES PATENT OFFICE.

ERHARD GRÜBLER, OF BORSDORF, NEAR LEIPZIG, GERMANY.

MOTOR TRACTOR.

1,422,438.  Specification of Letters Patent.  Patented July 11, 1922.

Application filed October 3, 1921. Serial No. 505,007.

*To all whom it may concern:*

Be it known that I, ERHARD GRÜBLER, of Borsdorf, near Leipzig, Germany, have invented certain new and useful Improvements in Motor Tractors, of which the following is a specification.

This invention relates to motor tractors wherein the rear wheels are supported by pendent arms or hangers and have between them a free space for the reception of the forward part of a trailer vehicle or of an implement such as a plough. According to the invention the said rear wheels are adjustable in the direction of travel and also at right angles to the plane of rotation.

An embodiment of the invention is shown in the accompanying drawing.

Figure 1:
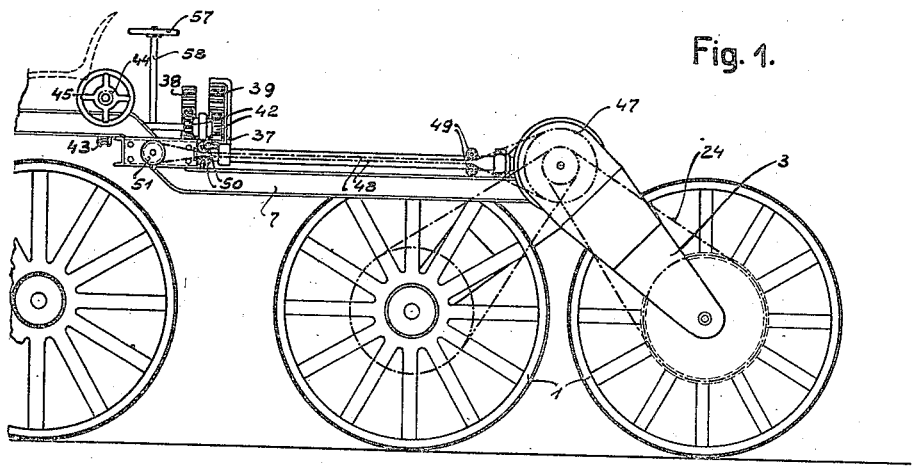
Figure 2:
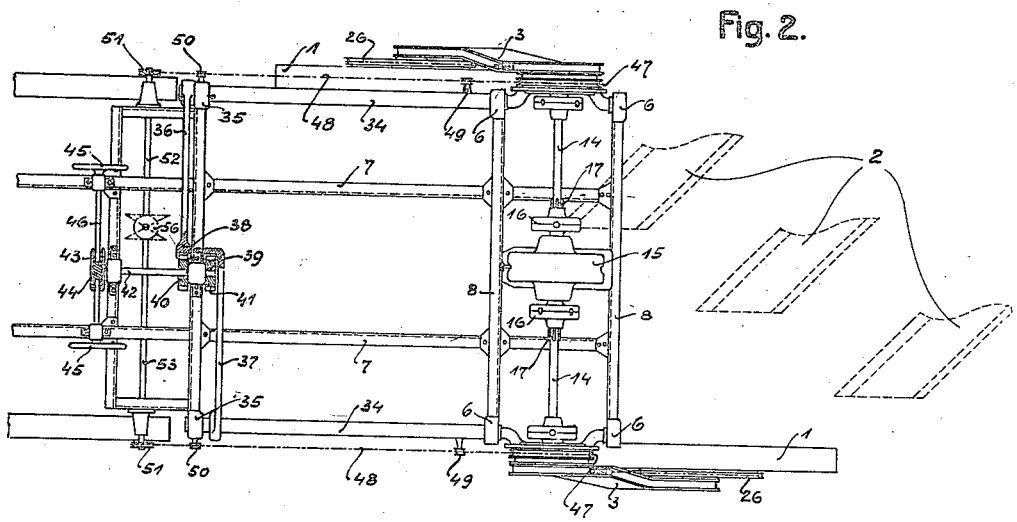
Figure 9:
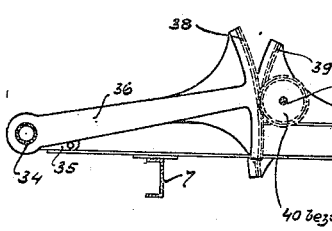
Figure 10:
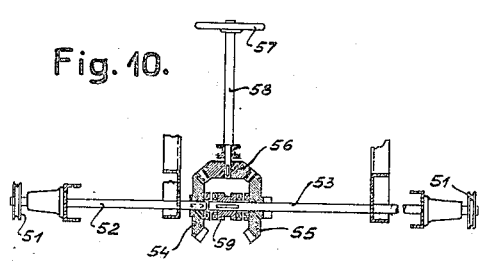
Figure 5:
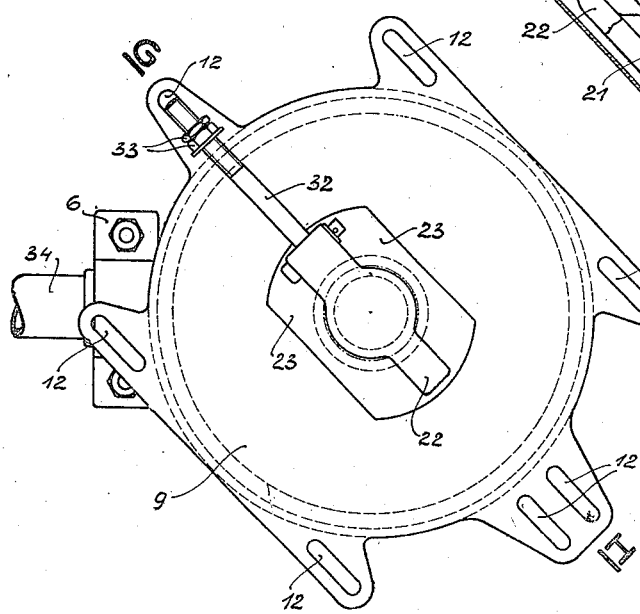
Figure 6:
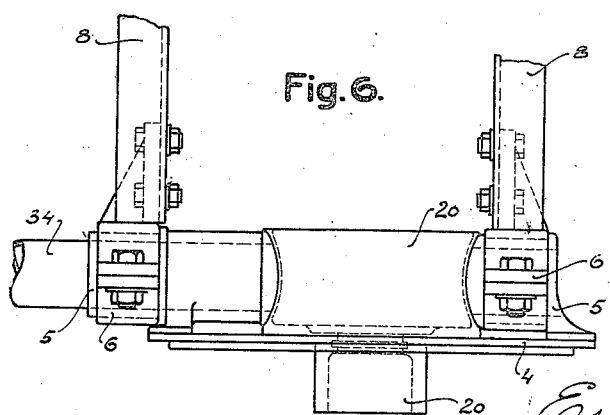

Figure 1 is a side elevation of the tractor vehicle. Figure 2 is a plan view of Figure 1, Figure 3 is a side elevation partly in vertical section of one of the rear wheel carriers. Figure 4 is a horizontal section on the line E—F of Figure 3. Figure 5 is a side elevation of part of the structure connecting the rear wheel carrier to the frame. Figure 6 is a plan view thereof, Figure 7 a section on the line G—H in Figure 5, and Figure 8 a front view of this part of the structure. Figures 9 and 10 show details of mechanism for the adjustment of the wheel carriers. Figure 11 is a vertical cross section of one of the rear wheels of the tractor together with a wheel of a trailer vehicle coupled therewith; Figure 12 is a partial side elevation of one of the tractor wheels, and Figure 13 a partial side elevation of one of the trailer wheels. Figure 14 is a sectional view of the hub of one of the tractor wheels, illustrating the manner of connecting thereto a trailing implement not mounted on wheels.

The rear road wheels 1 of the tractor are mounted on pendent arms 3. In Figures 1 and 2 these arms are shown in the position which they occupy when a plough 2, which is shown in broken lines in Figure 2, is connected with the tractor. Each of the arms 3, as shown in Figures 2 and 4, consists of a hollow body, of box shape, constructed after the manner of a box girder. The connection of the arm with the body frame of the vehicle is effected by means of a supporting plate 4, which is provided with pivots or trunnions 5 inserted into bearings 6. The bearings 6 are formed at the ends of beams 8 placed transversely of the longitudinal beams 7 of the body frame.

This arrangement enables the plate 4 and arm 3, with the wheel 1, to be swung out of the vertical plane, so that the gauge of the driving wheels can be increased.

An intermediate coupling member 9 is attached to the supporting plate 4 in such a manner that it may be rotated relatively to the supporting plate about an axis perpendicular to the axis of the trunnion 5. The hooked ends of bolts 10 carried by the supporting plate engage the circular flange 11 of the coupling member 9 and in this way effect the attachment of the member 9 to the plate 4.

Figure 7:
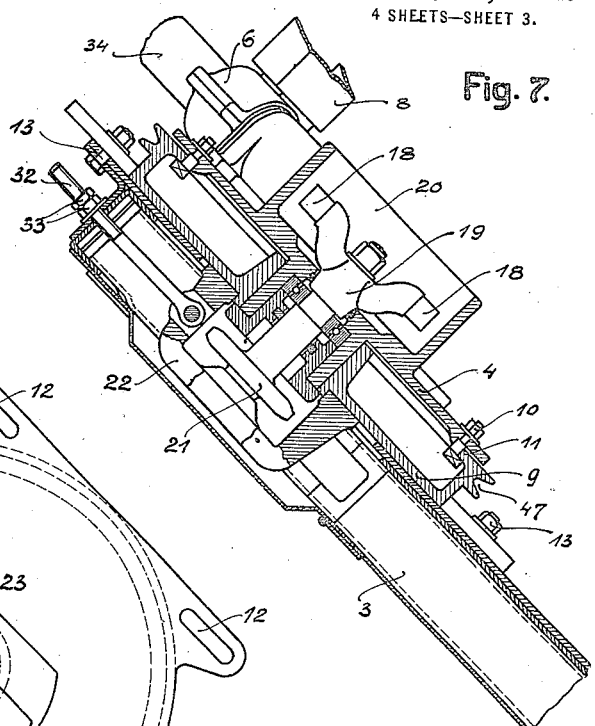
Figure 8:
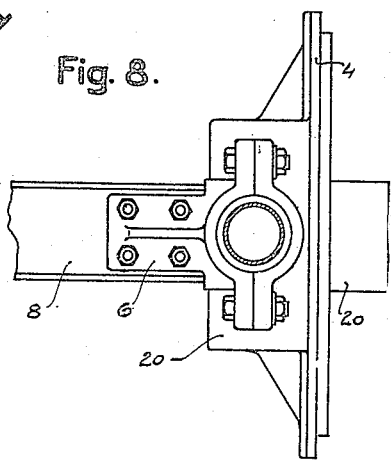

The coupling member is provided with slots 12, for bolts 13 Figure 7 engaging the arm 3. These slots permit of the adjustment of the arm 3 with relation to the coupling member in the longitudinal direction of the arm and transversely of the axis about which the coupling member is rotatable; that is to say they allow of regulating the effective length of the arm.

By turning the member 9 relatively to the supporting plate 4, and adjusting the arm on the said member, it is possible to alter the forward or rearward inclination of the arm 3 without altering the distance of the rear part of the tractor frame from the ground.

The crossbeams 8 form a portion of a frame-work, on which there is a shaft 14, with differential gear 15, which serves to actuate the driving wheels 1. The shaft 14 has universal joints 16 and slide joints 17, which enable it to be extended. In addition it has, near each end a universal joint 19, whose pivots 18 lie in the same plane as the trunnions 5 of the respective plate 4, which has flanges 20 forming a housing for the joint 19 and a portion of the shaft. Outside the joint 19 the shaft carries a chain wheel 21, and its end is mounted in a bracket 22 fixed to the member 9.

The bracket 22 projects into the arm 3, and has a flat foot 23, which engages into a slot in the wall of the arm. In this manner the arm 3 is afforded additional guidance in relation to the coupling member, and the bolts 13 are by this means relieved of shearing strain.

To strengthen the structure a rod 32 pivoted to the bracket 21 extends through the upper end of the arm 3, and is screw threaded to receive nuts 33, which are screwed tightly against the end surface of the arm.

The chain 24 which transmits the rotation of the chain wheel 21 to the driving wheel 1 passes through the interior of the arm 3. The lower portion 25 of the the arm 3 is outwardly deflected, and from its inner face projects an axle 27, on which the wheel 1 is mounted. To the wheel 1 is fixed a chain wheel 26 driven by the chain 24. The part 25 has a downward extension 28 having an inwardly directed stud 29, to which are hinged guards 30, 31 for the chain. As will be seen from Figures 11 to 13 the driving wheel 1 of the motor vehicle is coupled with the driving wheel 60 of the trailer. The wheel 60 of the trailer vehicle runs loosely on the journal 62 which forms a part of the axle 61 of the trailer vehicle.

The axle 27, which is in two parts, and is attached to the arm 3 by means of a nut 63, is provided with a recess 64, which is connected by means of an opening 65 with the free space between the driving wheels 1 of the tractor.

The journal 62 extends into the recess 64, in which its rounded end abuts against a spherical seat, so that slight deviations from correct alinement are possible. A bolt 66 is screwed into the end of the journal 62 and passes through a passage in the axle 27, outside which it carries a nut for coupling the parts 62 and 27.

The hub of the wheel 1 is provided with an annular series of holes 67 in which engage pins 68, projecting from the wheel 60. As a result of the engagement of these pins 68 in the holes 67 the wheel 60 is caused to rotate in conjunction with the wheel 1.

The arrangement which is illustrated in the drawing permits in a very simple manner of the centering of the wheels 1 and 60 and ensures a complete transmission of the driving and rotating forces. In order that the correct position of the parts may be arrived at, all that is necessary is to place the wheel 60 against the wheel 1, with the pins 68 in the holes 67, and then screw the nut on to the bolt 66.

In Figure 14, 69 shows a part of an implement not running on wheels, connected with the motor vehicle. By means of riveting, an attachment 70 is connected with the part 69, and carries a supporting pin 71, which in similar fashion to the bearing journal 62, as shown in Figure 11, engages in the recess 64 in the journal 27. The pin 71 is provided also with a collar 72 which fits against the wall of the recess 64.

The rotation of the supporting plates 4 in their bearings 6 for the purpose of swinging the arms 3 is preferably effected for both arms simultaneously by means of a mechanical attachment which can be operated from the seat of the driver of the vehicle.

For this purpose one of the trunnions 5 of each supporting plate 4 has fixed to it a shaft 34, preferably hollow. The shafts 34 extend from the bearings 6 to bearings 35 in the forward part of the frame, and they have fixed to their forward ends lever arms 36 and 37 respectively. The arm 36 carries a toothed segment 38 with the teeth on its convex face, and the arm 37 carries a toothed segment 39 with the teeth on its concave face. These toothed segments mesh with pinions 40 and 41 respectively, fixed to a shaft 42, to which is fixed a worm wheel 43 engaged with a worm 44 on a shaft 46. To the ends of the latter are fixed hand wheels 45. By the rotation of the shaft 46, the shafts 34 are caused to rotate in opposite directions, and by this means the plates 4 can be swung out of the vertical plane.

The rotation of the coupling members 9 in relation to the supporting plates is likewise brought about by mechanical means from the seat of the driver. The rims of the coupling members are provided with grooves 47 about which ropes 48 are passed, which run over guide rollers 49 and 50, and over pulleys 51. The guide rollers 50 are mounted on the frame of the vehicle, whereas the bearings of the rollers 49 are on the shaft 34. The pulleys 51 are fixed to shafts 52 and 53 respectively. These shafts are in alinement with each other. A bevel wheel 55 is mounted loosely on the shaft 53, and a bevel wheel 54 is fixed to the shaft 52. A bevel wheel 56 engages with the bevel wheels 54 and 55 and is fixed to a shaft 58 which can be rotated, by means of the hand wheel 57.

The shaft 53 extends beyond the bevelled wheel 55 to within a short distance of the bevelled wheel 54, and a slidable clutch sleeve 59 is keyed to the portion of the shaft 53 which lies between the bevelled wheels 54 and 55, the said sleeve partaking in the rotation of the shaft, but being movable in the longitudinal direction, of the same, and being furnished with dogs at its ends, adapted to engage with corresponding dogs on the bevelled wheels 54 and 55.

If the sleeve 59 is thrown into engagement with the dogs of the bevel wheel 54, the shafts 52 and 53 are coupled with each other and are caused to rotate in the same direction by turning the shaft 58 by means of the hand wheel, so that the two arms 3 are moved in the same direction.

If the sleeve is engaged with the bevel wheel 55 this wheel is coupled with the shaft 53, and by means of wheel 56 the shafts 52 and 53 are caused to rotate in opposite directions, which causes the arms 3 to move in opposite directions.

If the sleeve 59 is placed in the intermediate position, the bevelled wheel 56 causes only the wheel 54 and the shaft 52 to rotate, while the wheel 55 runs loosely on the shaft 53. In this case, only the arm which is connected with the shaft 52 is moved.

Claims.

1. In a motor tractor the combination of a body frame, two rear road wheels, and means connecting said road wheels to said frame whereby said wheels are adjustable in the direction of travel and also at right angles to the planes of rotation.

2. In a motor tractor the combination of a body frame, two pendent arms at opposite sides of the rear part of said frame, two road wheels supported by the lower ends of said arms respectively, and means connecting the upper ends of said arms to said frame, allowing of adjusting said arms by swinging the same towards the front and rear ends of the frame and also by swinging them outwards from the sides of said frame.

3. In a motor tractor, the combination of a body frame, two plates, one at each side of the rear part of said frame, pivots connecting said plates to said frame whereby said plates are rotatable about axes lying in the direction of travel, two pendent arms at opposite sides of said frame, two road wheels supported by said arms respectively, and adjustable means coupling said arms with said plates whereby said arms can be rocked outwards from the sides of the frame by rotating said plates and whereby said arms can also be adjusted by swinging them towards the front and rear ends of said frame.

4. In a motor tractor the combination of a body frame, two pendent arms at opposite sides of the rear part of said frame, two road wheels supported by the lower ends of said arms respectively, means connecting the upper ends of said arms to said frame, allowing of adjusting said arms by swinging the same towards the front and rear ends of the frame and also by swinging them outwards from the sides of said frame, a horizontal driving shaft mounted transversely on said frame, having near each of its ends a universal joint, and driving gear connecting the ends of said shaft to said road wheels respectively.

5. In a motor tractor the combination of a body frame, two plates, one at each side of the rear part of said frame, pivots connecting said plates to said frame, whereby said plates are rotatable about axes extending in the direction of travel, pendent arms at opposite sides of said frame, two road wheels supported by said pendent arms respectively, on each of said plates a coupling member rotatable about an axis perpendicular to the pivotal axis of the plate, adjustable means for fixing said coupling members to said plates respectively, and means connecting said arms to said coupling members respectively, allowing adjustment of said arms transversely of the axes about which said coupling members are rotatable, said pivoted plates allowing said arms to be swung out of the vertical plane, and said rotatable coupling members allowing said arms to be swung towards the front and rear ends of the tractor.

6. The combination claimed in claim 5, together with a horizontal driving shaft mounted transversely on the body frame, said shaft having near each of its ends a universal joint, on each of the rotatable coupling members a bracket having a bearing for one end of said shaft, and driving means connecting the ends of said shaft to the two road wheels respectively.

7. The combination claimed in claim 5, together with a horizontal driving shaft mounted transversely on the body frame, said shaft having near each of its ends a universal joint, on each of the rotatable coupling members a bracket having a bearing for one end of said shaft, chain wheels and driving chains connecting the ends of said shaft to the two road wheels respectively, and adjustable means connecting each of said brackets to one of the wheel supporting arms.

8. The combination claimed in claim 7, the wheel supporting arms being hollow and the ends of the driving shaft extending into said hollow arms.

9. In a motor tractor the combination of a body frame, two pendent arms, one at each side of the rear part of said frame, means connecting said arms to said frame, allowing of adjusting said arms by swinging the same towards the front and rear ends of the frame, and also outwards from the sides of the frame, on each of said arms an axle projecting from the inner face of said arm and having a recess at its end, whereby it is adapted to engage a trailer axle, and road wheels mounted on the axles projecting from said arms.

10. In a motor tractor the combination of a body frame, two pendent arms, one at each side of the rear part of said frame, means connecting said arms to said frame, allowing of adjusting said arms by swinging the same towards the front and rear ends of the frame, and also outwards from the sides of the frame, on each of said arms an axle projecting from the inner face of said arm and having a recess at its end, whereby it is adapted to engage a trailer axle in each of the axles projecting from said arms, a bolt adapted to couple therewith a trailer axle engaging the recess, and road wheels mounted on the axles projecting from said arms.

11. In a motor tractor the combination of a body frame, two plates at opposite sides of the rear part of said frame, pivots connecting said plates to said frame, whereby said plates are rotatable about axes lying in the direction of travel, means for rotating said plates, including shafts extending from said plates to the forward part of said frame, two pendent arms at opposite sides of said frame, two road wheels supported by said arms, and means coupling said arms with said plates, allowing of adjustment of said arms by swinging same towards the front and rear ends of said frame.

12. In a motor tractor the combination of a body frame, two plates at opposite sides of the rear part of said frame, pivots connecting said plates to said frame, whereby said plates are rotatable about axes lying in the direction of travel, means for rotating said plates, including shafts extending from said plates to the forward part of said frame, lever arms fixed to said shafts, means including worm gear and a hand wheel for collectively rocking said lever arms and thereby rotating said shafts, two pendent arms at opposite sides of said frame, two road wheels supported by said arms, and means coupling said arms with said plates, allowing of adjustment of said arms by swinging same towards the front and rear ends of said frame.

13. In a motor tractor the combination of a body frame, two plates, one at each side of the rear part of said frame, pivots connecting said plates to said frame, whereby said plates are rotatable about axes extending in the direction of travel, pendent arms at opposite sides of said frame, two road wheels supported by said pendent arms respectively, on each of said plates a coupling member rotatable about an axis perpendicular to the pivotal axis of the plate, adjustable means for fixing said coupling members to said plates respectively, means including actuating mechanism on the forward part of the frame for rotating said coupling members, and means connecting said arms to said coupling members respectively, allowing adjustment of said arms transversely of the axes about which said coupling members are rotatable, said pivoted plates allowing said arms to be swung out of the vertical plane, and said rotatable coupling members allowing said arms to be swung towards the front and rear ends of the tractor.

14. In a motor tractor the combination of a body frame, two plates, one at each side of the rear part of said frame, pivots connecting said plates to said frame, whereby said plates are rotatable about axes extending in the direction of travel, pendent arms at opposite sides of said frame, two road wheels supported by said pendent arms respectively, on each of said plates a coupling member rotatable about an axis perpendicular to the pivotal axis of the plate, adjustable means for fixing said coupling members to said plates respectively, means including actuating mechanism on the forward part of the frame, said actuating mechanism including a clutch and reversing gear whereby said coupling members can be rotated alternatively in the same direction or in opposite directions, and means connecting said arms to said coupling members respectively, allowing adjustment of said arms transversely of the axes about which said coupling members are rotatable, said pivoted plates allowing said arms to be swung out of the vertical plane, and said rotatable coupling members allowing said arms to be swung towards the front and rear ends of the tractor.

In witness whereof I have signed this specification.

ERHARD GRÜBLER.